(12) United States Patent
Rydbeck et al.

(10) Patent No.: US 7,123,936 B1
(45) Date of Patent: *Oct. 17, 2006

(54) CELLULAR PHONE WITH EXPANSION MEMORY FOR AUDIO AND VIDEO STORAGE

(75) Inventors: Nils R. C. Rydbeck, Cary, NC (US); John Fussell, Raleigh, NC (US)

(73) Assignee: Ericsson Inc., Research Triangle Park, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1084 days.

(21) Appl. No.: 09/025,395

(22) Filed: Feb. 18, 1998

(51) Int. Cl.
*H04B 1/38* (2006.01)
*H04M 1/00* (2006.01)

(52) U.S. Cl. ............... 455/557; 455/556.1; 455/569.1; 455/575.2

(58) Field of Classification Search ........... 455/550, 455/557, 563, 566, 568, 569, 575, 90, 95, 455/100, 66, 344, 527, 528, 415, 404, 558, 455/556, 556.1, 575.1–575.6, 57.8, 575.9, 455/517, 556.2, 90.1, 90.2, 90.3, 550.1, 569.1, 455/404.1; 379/110.01, 127, 142
See application file for complete search history.

(56) References Cited

U.S. PATENT DOCUMENTS

| | | | |
|---|---|---|---|
| 4,481,382 A | | 11/1984 | Villa-Real |
| 4,591,661 A | * | 5/1986 | Benedetto et al. .......... 455/568 |
| 4,875,229 A | | 10/1989 | Palett et al. |
| 4,993,061 A | * | 2/1991 | Hsieh ......................... 455/403 |
| 5,099,514 A | | 3/1992 | Acree |
| 5,243,640 A | * | 9/1993 | Hadley et al. ........... 455/426.1 |
| 5,408,528 A | | 4/1995 | Carlson et al. |
| 5,473,671 A | * | 12/1995 | Partridge, III .............. 455/445 |
| 5,522,049 A | * | 5/1996 | Kimura et al. .............. 710/301 |
| 5,550,754 A | | 8/1996 | McNelley et al. |
| 5,594,779 A | * | 1/1997 | Goodman .................. 455/3.04 |
| 5,661,788 A | * | 8/1997 | Chin ..................... 379/142.01 |
| 5,668,868 A | | 9/1997 | Nordenstrom |
| 5,722,069 A | * | 2/1998 | Donner ....................... 455/418 |
| 5,845,219 A | * | 12/1998 | Henriksson ................. 455/567 |
| 5,890,074 A | * | 3/1999 | Rydbeck et al. ............ 455/558 |
| 5,978,689 A | * | 11/1999 | Tuoriniemi et al. ...... 455/569.1 |
| 5,987,106 A | * | 11/1999 | Kitamura ............... 379/110.01 |
| 5,992,637 A | * | 11/1999 | Weder ........................ 206/584 |
| 6,006,115 A | * | 12/1999 | Wingate .................. 455/575.2 |
| 6,243,596 B1 | * | 6/2001 | Kikinis ....................... 455/572 |

(Continued)

FOREIGN PATENT DOCUMENTS

DE 19528424 A 11/1996

(Continued)

*Primary Examiner*—Charles N. Appiah
(74) *Attorney, Agent, or Firm*—Coats & Bennett, P.L.L.C.

(57) ABSTRACT

A cellular telephone includes an internally integrated digital entertainment module. The telephone includes a transceiver unit and a headset which is connected to the transceiver unit by wired or wireless link. The entertainment module includes an interchangeable ROM and/or expansion RAM for storing music or other audio signals for playback through the telephone's headset. Music or other audio signals in digitized form is stored in the interchangeable ROM or is loaded into the expansion RAM from a CD player, computer, or other source of digitized audio signals. Under control of the cellular telephone's microprocessor, the digitally stored audio signal is played back through the telephone's headset. The entertainment module may be located in the transceiver unit, a removable battery pack, or in a separate adapter.

19 Claims, 7 Drawing Sheets

U.S. PATENT DOCUMENTS

| | | | |
|---|---|---|---|
| 6,516,466 B1 * | 2/2003 | Jackson | 725/62 |
| 6,563,805 B1 * | 5/2003 | Ma et al. | 370/325 |
| 6,594,366 B1 * | 7/2003 | Adams | 381/74 |
| 6,662,022 B1 * | 12/2003 | Kanamori et al. | 455/556.1 |
| 6,681,120 B1 * | 1/2004 | Kim | 455/556.1 |
| 6,944,287 B1 * | 9/2005 | Mori | 379/390.01 |
| 6,980,827 B1 * | 12/2005 | Lin et al. | 455/556.1 |

FOREIGN PATENT DOCUMENTS

| | | |
|---|---|---|
| EP | 0 665 655 A2 | 8/1995 |
| GB | 2289555 A | 11/1995 |
| GB | 2308775 A | 7/1997 |
| JP | 5-91169 A * | 4/1993 |
| JP | 2001-268181 * | 9/2001 |
| JP | 2001-333152 * | 11/2001 |
| WO | WO 97/26744 | 7/1997 |

\* cited by examiner

CELLULAR PHONE WITH EXPANSION MEMORY FOR AUDIO AND VIDEO STORAGE

FIELD OF THE INVENTION

The present invention relates generally to mobile communication devices, and more particularly to portable radio communication devices having an integral entertainment module including RAM or ROM for storing audio, video and/or still images.

BACKGROUND OF THE INVENTION

In the past two decades, advances in digital electronic technology have led to a rapid growth in the area of entertainment oriented consumer electronic devices. In particular, portable electronic devices such as audio CD players, FM/AM radio receivers, and even television or video tape/disc players have become increasingly popular among consumers as they have become small, lightweight, and easy for an individual to carry.

While quite popular with consumers, the mass storage type devices (audio CD, video tape/disc) typically suffer from motion induced distortion otherwise known as bouncing or skipping. These problems arise, in part, as a result of the required motion of the mass storage medium during normal operation. That is, in the case of an audio CD or a video disc, the disc which comprises the storage medium is typically spun or rotated at a relatively high speed while the information stored on the disc is read by an associated read head. Proper and precise alignment of the read head with respect to the spinning storage medium must be maintained at all times in order to insure error free reading of the stored data. Such precise alignment is often difficult to maintain when the audio or video player is being used in manner which is conducive to extreme vibration or mechanical shock. In practice, mechanically harsh activities such as jogging or running are common among users of portable electronics, particularly with regard to the use of portable audio CD players. In such cases, skipping or bouncing artifacts induced in the CD player can seriously impair the overall performance of the player.

With further regard to the recreational athletic activities of portable electronics consumers, it is often the case such consumers will carry not only an audio CD player for entertainment purposes, but also a cellular telephone for safety and security. Although such equipment provides the desired entertainment/security services to the athletically active consumer, the need to carry multiple pieces of equipment is generally viewed as inhibiting or impairing to their athletic endeavors.

Therefore, there is and continues to be a need for a practical and efficient technique for incorporating the functionality of audio and/or video playing devices within wireless communications devices such as cellular telephones.

SUMMARY OF THE INVENTION

The present invention is a cellular telephone particularly adapted for leisure activities. The cellular telephone of the present invention includes a portable transceiver unit and a headset which can be worn by the user during leisure activities such as jogging, biking, gardening, etc. The transceiver unit includes a fully functional transceiver capable of sending and receiving voice and data signals via an RF carrier. The transceiver unit has an integral digital entertainment module including a memory for storing music or other audio signals for playback through the headset. For purposes of this application, memory means all forms of computer memory but does not include disk storage, tape storage or other memory requiring electromechanical read systems. The memory may be in the form of a removable ROM cartridge and/or an expansion RAM. In those embodiments having an expansion RAM, an input port is provided for loading music or other audio signals into the expansion RAM from a CD player, computer, or other source of digitized audio.

Under the control of the transceiver unit's microprocessor, the digitally stored audio signal is played out through the telephone's headset, which in the preferred embodiment comprises stereo headphones. The headset may be connected to the phone by a wired or wireless link. Because of its integration into the cellular phone, the digital entertainment module can share components already present in the cellular phone. Such savings would not be available if a CD player were simply aggregated with the phone. Further, the use of solid state RAM or ROM, as opposed to disc storage, eliminates the need for bounce control circuitry. This enables the disclosed invention to provide cellular communications and entertainment during leisure activities.

In another aspect of the present invention, the digital entertainment module could be located in a removable battery pack which attaches to the transceiver unit, or in a separate adapter which plugs into the transceiver unit. Locating the digital entertainment module in either a battery pack or separate adapter allows the manufacturer to offer the digital entertainment module as an optional accessory which does not need to be purchased at the same time the cellular phone is purchased. This allows consumers who purchase a phone without the digital entertainment module to later purchase the battery pack or adapter as an upgrade to the existing phone.

DETAILED DESCRIPTION OF THE INVENTION

Figure 1:
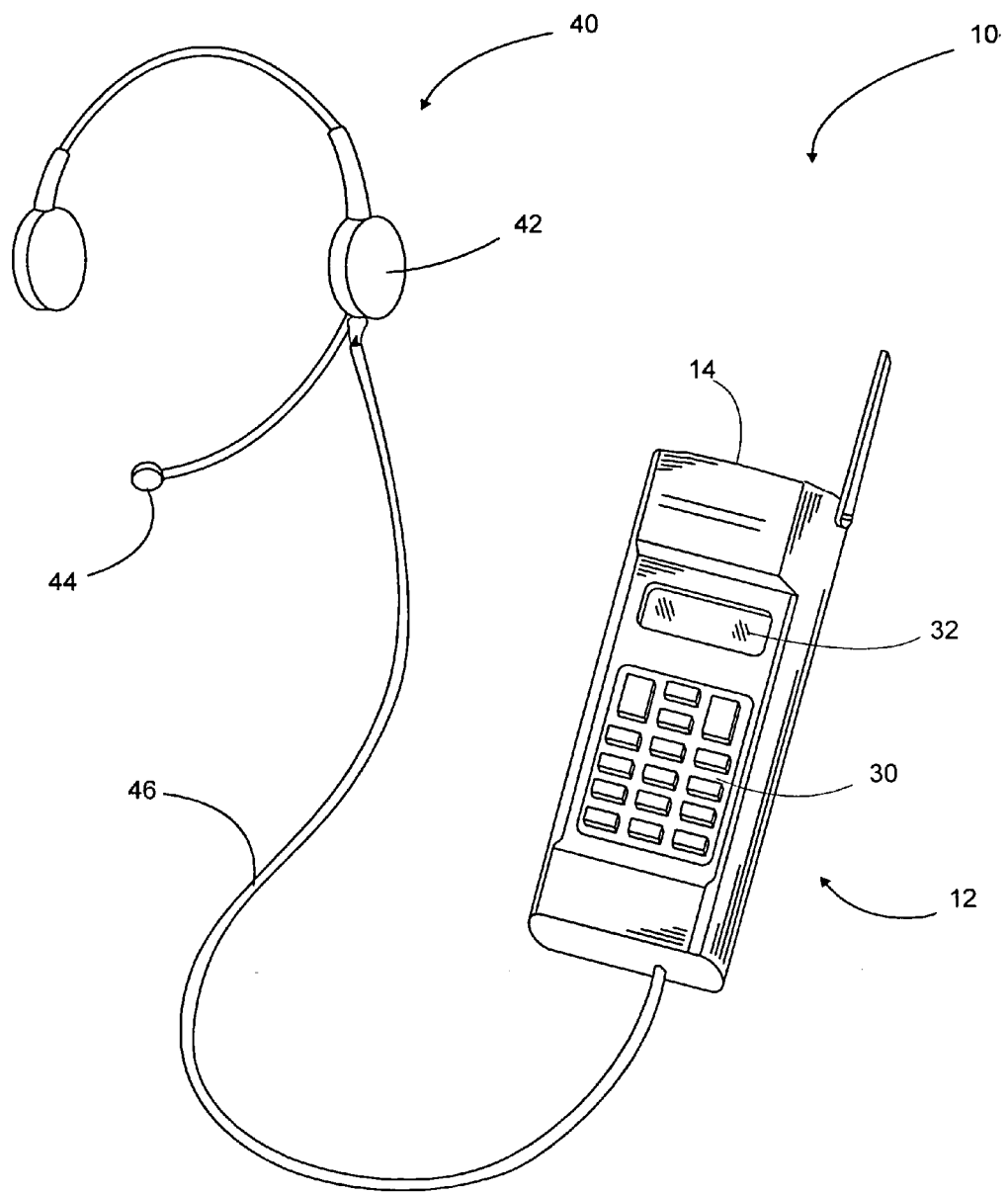
FIG. 1 is a perspective view of the portable communication device of the present invention.
Figure 2:
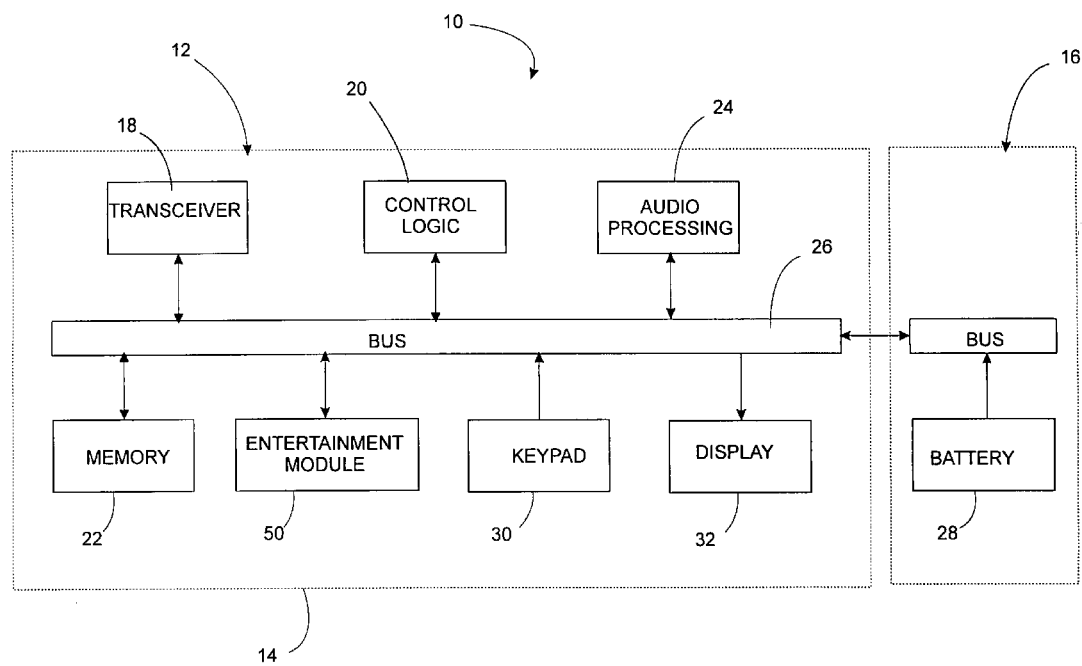
FIG. 2 is a block diagram of the portable communication device.
Figure 3:
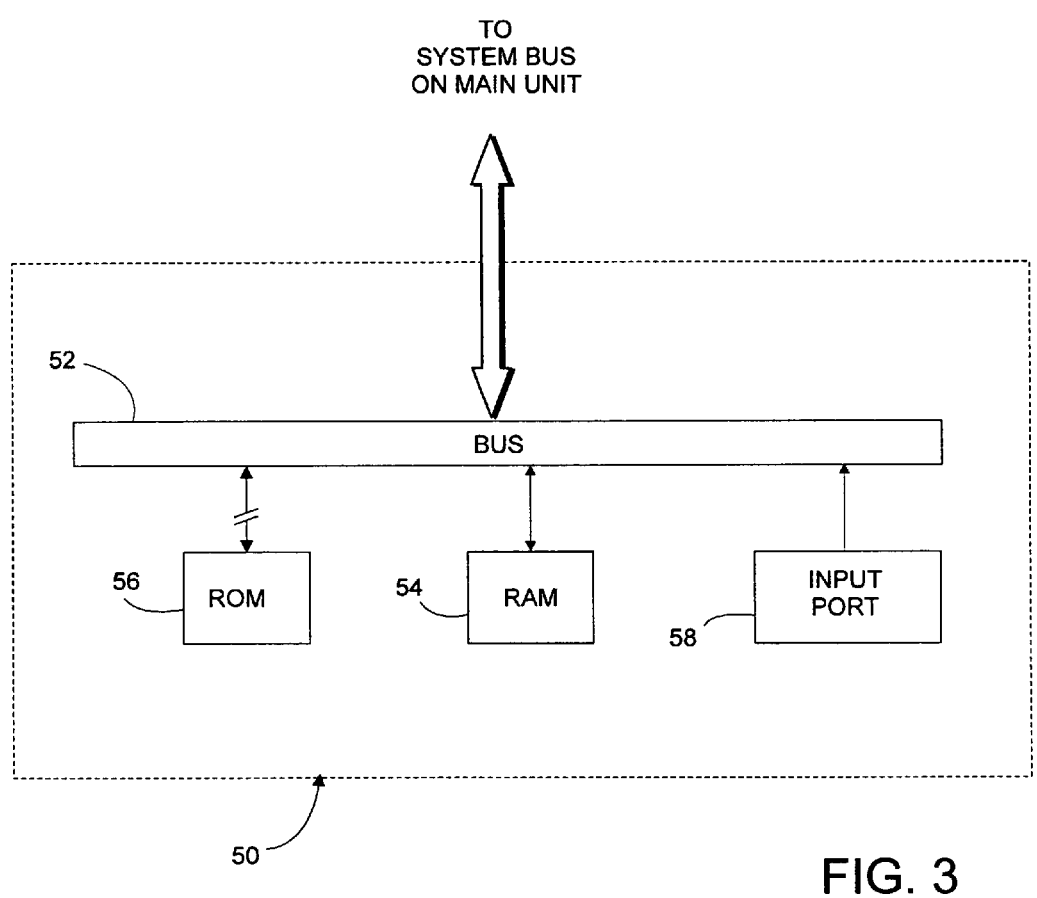
FIG. 3 is a block diagram of the entertainment module contained in the portable communication device.

Referring now to the drawings, and particularly to FIGS. 1 through 3, the cellular phone of the present invention is shown therein and indicated generally by the numeral 10.

The cellular phone 10 of the present invention is particularly adapted for use during leisure activities such as jogging, hiking, gardening, etc.

The cellular phone 10 includes a transceiver unit 12 and a headset 40 which can be worn on the head by the user. The transceiver unit 12 includes a main housing 14 and a removable battery pack 16 containing a rechargeable battery 28. Housing 14 of the transceiver unit 12 contains an RF transceiver 18, control logic 20, program memory 22, and audio processing unit 24 which are operatively connected by a system bus 26. The RF transceiver 18 may be, for example, a class 1 mobile phone transceiver capable of transmitting and receiving radio signals containing voice and/or data. Audio processing unit 24 processes voice and data signals that are transmitted and received by the transceiver 18. Audio processing unit 24 may include voice recognition circuitry to enable activation and use of the phone 10 by voice commands for truly hands-free operation. The control logic 20 controls the operation of the transceiver 18 according to instructions stored in program memory 22. A keypad 30 and display 32 provide a user interface. Keypad 30 enables the user to enter dialing instructions and commands to initiate a call, and to select options. The display 32 displays the number dialed and call status information to the user. Display 32 may also display instructions or options to the user. Unlike a conventional cellular phone, the transceiver unit 12 of the present invention does not include an internal microphone and speaker, though such is within the scope of the contemplated invention.

The headset 40 includes stereo speakers 42 and microphone 44 that are connected to the transceiver unit 12 by a cable 46. Cable 46 may include a plug (not shown) which removably mates with a corresponding jack on the transceiver unit 12. The cable 46 connects to the system bus 26 which routes audio signals from the audio processing unit 24 to and from the headset 40 under the control of the microprocessor 20. The jack could also connect directly to audio processing circuit 24. Alternatively, the headset 40 could communicate wirelessly with the transceiver unit 12, for example, by means of an infrared carrier, low power RF carrier or magnetic link.

The portable telephone 10 of the present invention includes a built-in digital entertainment module 50 (DEM) which allows music or other audio signals to be "played-back through the cellular telephone's headset 40. The entertainment module 50 includes extended RAM and/or removable memory cartridges for storing music or other audio signals which can be played back through the headset 40 of the phone 10.

Referring now to FIG. 3, a schematic diagram of the digital entertainment module 50 is shown. The digital entertainment module 50 includes a secondary bus 52, extended random access memory (RAM) 54, removable ROM 56, and an input 58. The extended RAM 54 may, for example, be a flash EPROM chip capable of storing digitized audio. Digitized audio is loaded into the flash EPROM via input 58. The input 58 may be a serial port, parallel port, infra-red data port, modem, or any other type of input device capable of interfacing with a source of digitized audio, such as a CD player, or computer. It is also contemplated that audio may be obtained from the transceiver unit 12 in an "internet-enabled" phone 10. The removable ROM 56 is preferably in the form of a cartridge which fits into a slot in the transceiver unit 12. The ROM cartridge 54 would contain pre-recorded music which could be purchased by the user. In the preferred embodiment, the data format of both the extended RAM 54 and removable ROM 56 would be organized according to CD-ROM standards, which is 14 bits per sample and 44.1 k samples per second.

In operation, the user would insert a removable ROM cartridge 56 into the transceiver unit 12 or load audio into the extended RAM 54 from a CD player, computer, or other source of digitized audio. The transceiver unit 12 is attached to the belt or other article of clothing worn by the user. The headset 40 is placed on the user's head and connected to the transceiver unit 12. Playback of audio in the extended RAM 54 or removable ROM 56 could be activated via the keypad 30, or alternately, by voice command. The audio would be played back through the headset 40 under control of the microprocessor 20 while the user engages in leisure activities. When an incoming call is received, the microprocessor 20 automatically mutes or stops the playback of audio from the digital entertainment module 50 until the call is terminated. Preferably, the transceiver unit 12 includes a preferred caller list stored in a screening memory which may be part of program memory 22 or separate therefrom but in communication with the control logic 20. This preferred caller list is used to screen incoming calls such that only calls from callers on the preferred caller list cause the playback of audio from the digital entertainment module 50 to be muted or stopped; calls from callers not on the preferred caller list preferably do not cause such response. Upon termination of the call, the microprocessor 20 would unmute or restart the playback of audio from the digital entertainment module 50.

A significant advantage of the present invention is that audio is played back from solid state RAM or ROM memory thus eliminating the need for bounce control circuitry which is commonly used in portable CD players. Further, because of its integration into the cellular phone 10, there is no need for the user to carry both a portable audio player and a cellular phone. Moreover, integration of the entertainment module 50 into the cellular phone 10 allows the entertainment module 10 to share components with the cellular phone 10 to take advantage of the phone's communication capability to load the RAM 54. Thus, the present invention could replace both a conventional cellular phone and portable audio player at lower cost than a conventional walk-man and telephone.

Figure 4:
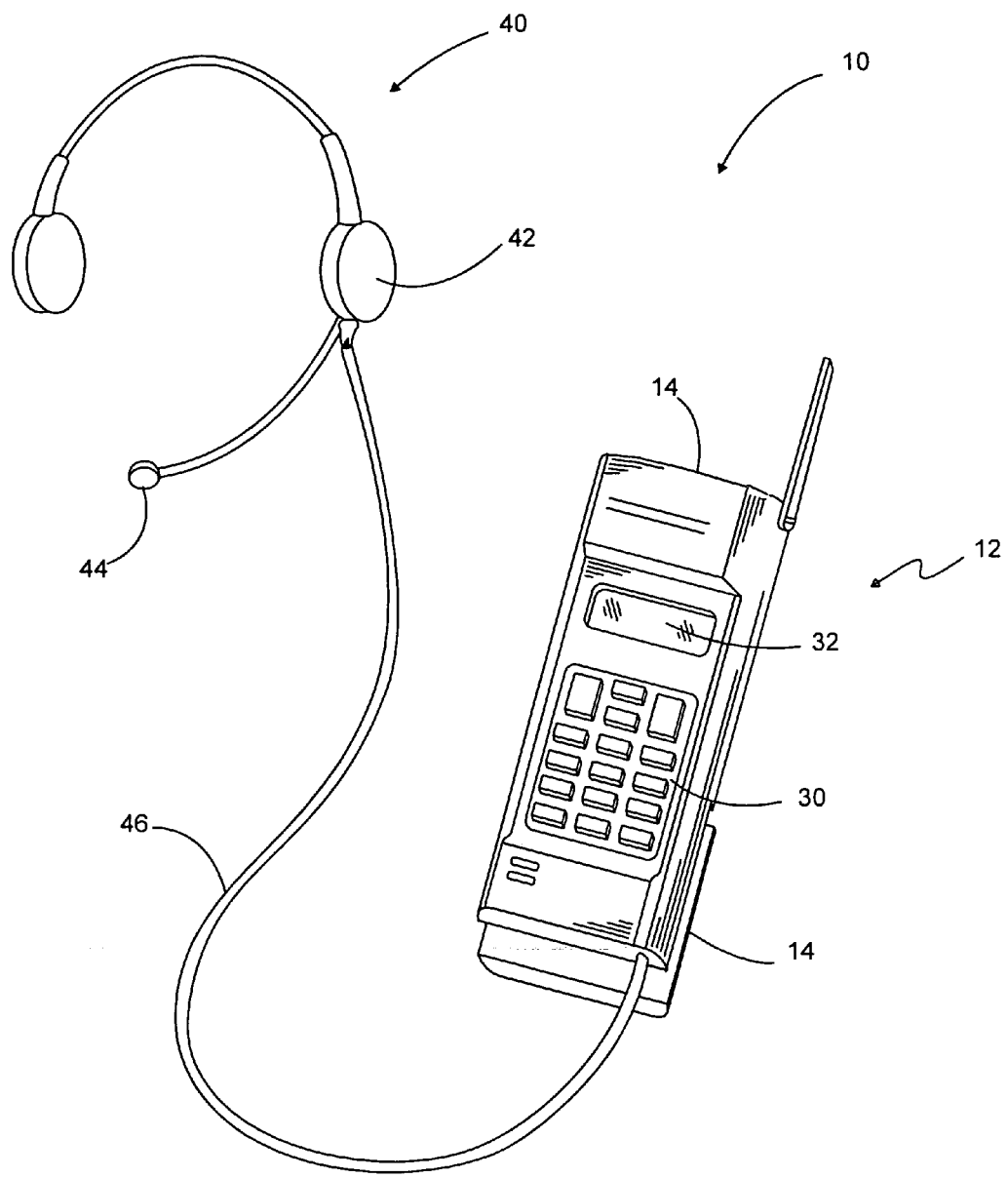
FIG. 4 is a perspective view of a second embodiment of the portable communication device in which the digital entertainment module is located in a removable battery pack.
Figure 5:
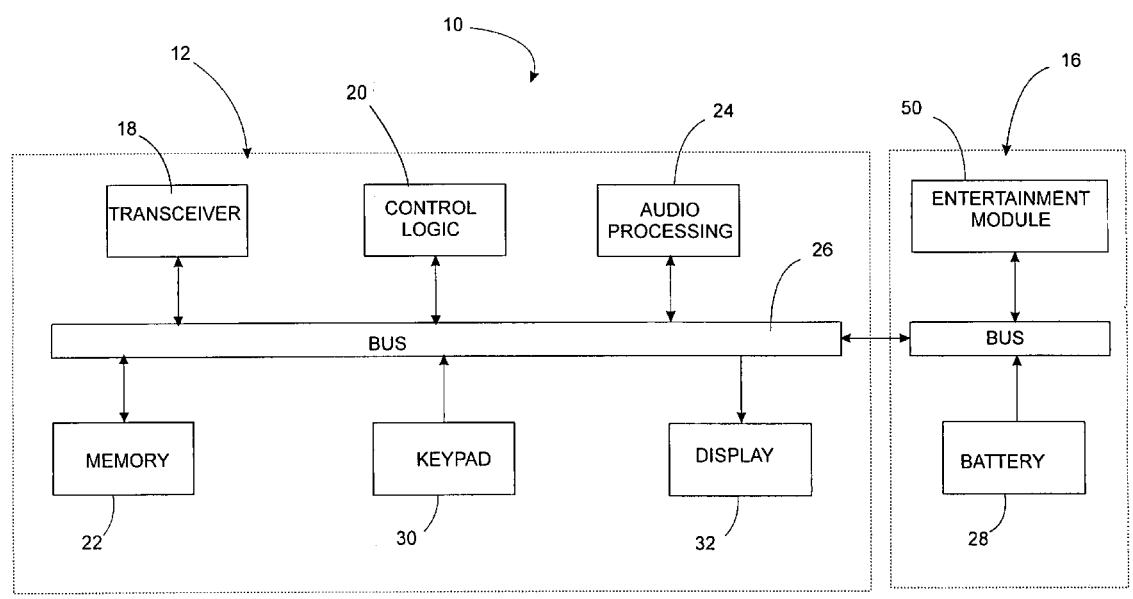
FIG. 5 is a block diagram showing the second embodiment of the portable communication device in which the entertainment module is located in a removable battery pack.

Referring now to FIGS. 4 and 5, a second embodiment of the present invention is shown. The second embodiment is similar to the first embodiment and, therefore, the same reference numerals will be used to identify similar components. As shown in FIGS. 4 and 5, the second embodiment of the phone 10 includes a transceiver unit 12 with a removable battery pack 14, and a headset 40 connected to the transceiver unit 12. The transceiver unit 12 includes a transceiver 18, microprocessor 20, program memory 22, audio processing circuits 24, keypad 30 and display 32 as previously described. Similarly, the headset 40 includes stereo speakers 42 and microphone 44. The second embodiment differs from the first in that the digital entertainment module 50 is contained within the removable battery pack 14. The entertainment module 50 connects to a secondary bus in the battery pack 14. When the battery pack 14 is attached to the transceiver unit 12, a connection is made between the secondary bus in the battery pack 14 and the main bus 26 of the transceiver unit 12. The main bus 26 and secondary bus enable the routing of audio signals between the entertainment module 50 and audio processing circuits 24 under the control of the microprocessor 20.

Figure 6:
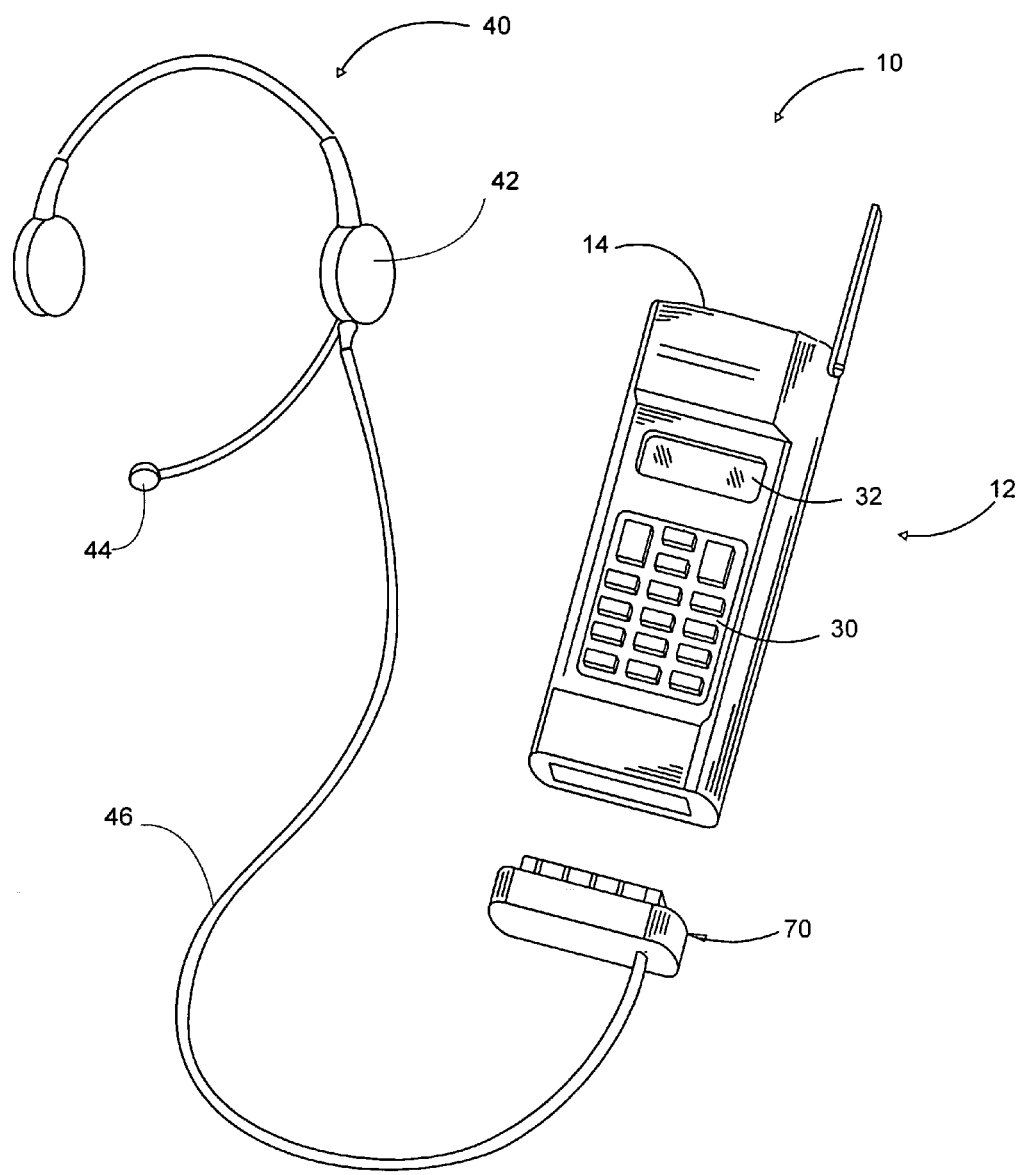
FIG. 6 is a perspective view of a third embodiment of the portable communication device in which the digital entertainment module is located in a separate adapter with attaches to the transceiver unit.
Figure 7:
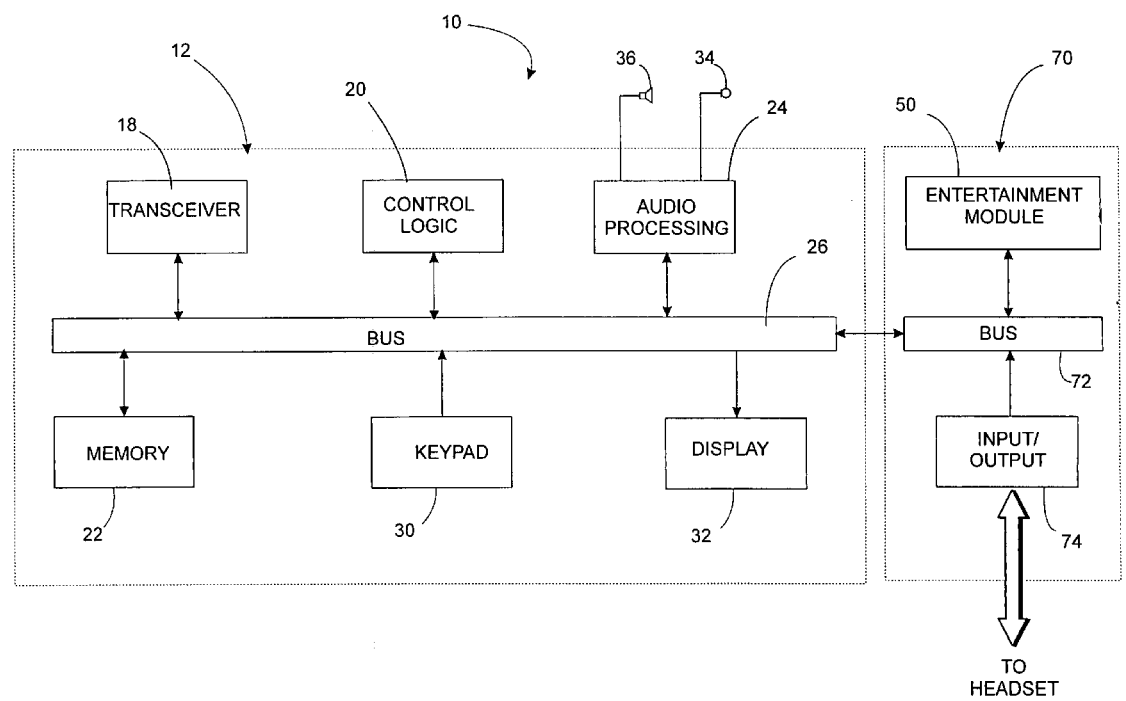
FIG. 7 is a block diagram showing the third embodiment of the portable communication device in which the entertainment module is located in a separate adapter.

FIGS. 6 and 7 show a third embodiment of the present invention. The third embodiment is similar to the first and second embodiments and therefore the same reference numbers will be used to identify similar components. As shown in FIGS. 6 and 7, the third embodiment includes a transceiver unit 12, headset 40, and adapter 70. The transceiver unit 12 includes a transceiver 18, microprocessor 20, program memory 22, audio processing circuits 24, keypad 30, and display 32. In addition, the transceiver unit 12 in the third embodiment includes an internal microphone and speaker 34 and 36 respectively. Thus, the transceiver unit 12 can be used without the headset 40.

The headset 40 includes a pair of stereo speakers 42 and microphone 44. The headset 40 is connected by a cable 46 to the adapter 70. The entertainment module 50 is contained in the adapter 70. The adapter 70 includes a secondary bus 72 which connects to the main bus 26 on the transceiver unit when the adapter 70 is plugged into the transceiver unit 12. An input/output circuit 74 routes audio signals to and from the headset 40.

When the transceiver unit 12 is used without the adapter 70, audio signals are routed under the control of the microprocessor from the audio processing circuits 24 to the internal microphone and speaker 34 and 36. When the adapter 70 is plugged into the transceiver unit 12, the audio signals are routed to the microphone 44 and speakers 42 on the headset 40.

The configuration of the phone 10 shown in FIGS. 6 and 7 is advantageous in that it allows the transceiver unit 12 to be sold without the digital entertainment module 50 and later upgraded by the consumer. The adapter 70 and headset 40 could be sold separately as an accessory or at a later time as an upgrade. Thus, a single phone could be manufactured for use both with and without the digital entertainment module 50.

It will be apparent to those skilled in the art that the digital entertainment module 50 could also be used to store video or still images which could be output to the display 32 of the transceiver unit 12. Any sound accompanying the video would be played back through the headset 40 or internal speaker. It should also be apparent that the digital entertainment module 50 could include a broadcast receiver for receiving conventional radio and TV broadcasts in addition to its entertainment memory.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A mobile radio communication device comprising:
   a. a transceiver unit for transmitting and receiving audio signals;
   b. a speaker operatively connected to said transceiver unit for converting audio signals received by said transceiver unit into audible signals which can be heard by a user;
   c. a microphone operatively connected to said transceiver unit for converting the user's voice into audio signals for transmission by said transceiver;
   d. memory operatively connected to said transceiver unit for storing pre-recorded audio for subsequent playback through said speaker; and
   e. a screening memory in communication with said transceiver for storing a list of preferred callers, wherein when an incoming call is received during playback of said pre-recorded audio, playback stops if said incoming call is from a caller on said list of preferred callers.

2. The mobile radio communication device according to claim 1 wherein said memory is an erasable memory.

3. The mobile radio communication device according to claim 1 wherein said memory is an unerasable memory.

4. The mobile radio communication device according to claim 1 wherein said memory is contained in said transceiver unit.

5. The mobile radio communication device according to claim 1 further including a removable cartridge insertable into said transceiver unit, wherein said memory is contained in said removable cartridge.

6. The mobile radio communication device according to claim 1 further including a removable battery pack attachable to said transceiver unit, said memory being located in said battery pack.

7. The mobile communication device according to claim 1 further including a detachable adapter for attaching to said transceiver unit, said memory being located in said adapter.

8. The mobile radio communication device according to claim 1 further including a headset, wherein said speaker and microphone are mounted to said headset.

9. The mobile radio communication device according to claim 1 further including a input port operatively connected to said memory for loading audio into said memory.

10. A cellular telephone having an entertainment module for playing pre-recorded audio and video signals comprising:
    a. a transceiver for transmitting and receiving audio and data signals;
    b. a microprocessor for controlling the operation of said transceiver;
    c. a signal processing circuit operatively connected to the transceiver and microprocessor for processing signals transmitted and received by the transceiver;
    d. an entertainment module with a computer memory operatively connected to the microprocessor and signal processing circuits for storing audio and video signals for subsequent playback under the control of said microprocessor; and
    e. a screening memory in communication with said microprocessor for storing a list of preferred callers,
    f. wherein said microprocessor stops playback of stored audio and video signals responsive to an incoming call from a preferred caller such that a user may receive said incoming call free from playback of said audio and video signals.

11. The cellular telephone of claim 10 wherein said memory comprises an erasable and programmable memory for storing and playing audio and video signals.

12. The cellular telephone of claim 11 including an input coupled to the erasable and programmable memory for downloading and storing audio and video signals into said erasable and programmable memory.

13. The cellular telephone of claim 11 wherein said erasable and programmable memory is coupled to a headset port in the cellular telephone, thereby permitting audio signals to be directed from the erasable and programmable memory memories to a headset coupled to the cellular telephone via the headset port.

14. The cellular telephone of claim 11 wherein the microprocessor is pre-programmed to preempt output from said erasable and programmable memory in response to an incoming call or the initiation of an outgoing call.

15. The cellular telephone of claim 10 wherein said memory comprises a permanent memory which is removable from said cellular telephone for storing and playing audio and video signals.

16. The cellular telephone of claim 10 wherein the entertainment module includes a first memory which is programmable and erasable, an input coupled to said first memory for downloading and storing audio and video signals into said first memory, and a second permanent memory having pre-recorded audio and video signals stored therein.

17. The cellular telephone according to claim 16 wherein said second memory is a removable and interchangeable memory cartridge.

18. A mobile radio communication device comprising:
   a. a transceiver unit for transmitting and receiving audio signals;
   b. a speaker operatively connected to said transceiver unit for converting audio signals received by said transceiver unit into audible signals which can be heard by a user;
   c. a microphone operatively connected to said transceiver unit for converting the user's voice into audio signals for transmission by said transceiver;
   d. memory operatively connected to said transceiver unit for storing pre-recorded audio for subsequent playback through said speaker;
   e. a peripheral audio output device including an adapter configured to mate with a system connector connected to the transceiver unit, said memory being located in said adapter.

19. The mobile radio communication device of claim 18 wherein the peripheral audio output device comprises a headset.

\* \* \* \* \*